United States Patent
Yang et al.

(10) Patent No.: US 11,390,306 B1
(45) Date of Patent: Jul. 19, 2022

(54) METHOD AND SYSTEM FOR MULTI-OBJECTIVE OPTIMIZATION OF URBAN TRAIN OPERATION

(71) Applicant: East China Jiaotong University, Nanchang (CN)

(72) Inventors: Hui Yang, Nanchang (CN); Yanli Zhou, Nanchang (CN); Miao Yan, Nanchang (CN); Luojun Yang, Nanchang (CN); Zhongqi Li, Nanchang (CN)

(73) Assignee: East China Jiaotong University, Nanchang (CN)

( * ) Notice: Subject to any disclaimer, the term of this patent is extended or adjusted under 35 U.S.C. 154(b) by 0 days.

(21) Appl. No.: 17/524,187

(22) Filed: Nov. 11, 2021

(30) Foreign Application Priority Data

Aug. 11, 2021 (CN) .......................... 202110916064.6

(51) Int. Cl.
- *B61L 27/00* (2022.01)
- *B61L 27/16* (2022.01)
- *G06N 3/00* (2006.01)

(52) U.S. Cl.
CPC .............. *B61L 27/16* (2022.01); *G06N 3/006* (2013.01)

(58) Field of Classification Search
CPC ................................ B61L 27/16; G06N 3/006
See application file for complete search history.

(56) References Cited

U.S. PATENT DOCUMENTS 6,332,106 B1 * 12/2001 Hawthorne .............. G09B 9/04
701/19

FOREIGN PATENT DOCUMENTS

CN 109858154 6/2019

OTHER PUBLICATIONS $1^{st}$ Office Action CN113361150, dated Jul. 9, 2021, East China Jiaotong University—owned by Applicant.
$2^{nd}$ Office Action CN113361150, dated Jul. 9, 2021, East China Jiaotong University—owned by Applicant.
Xi-Hui, Y., et al. Research on multi-objective high-speed train operation optimization based on differential evolution. Tiedao Xuebao/ Journal of the China Railway Society. 35:65-71 (2013)0 DOI: 10.3969/j.issn.1001-8360.2013.09.011.

* cited by examiner

*Primary Examiner* — Ian Jen
(74) *Attorney, Agent, or Firm* — Brian S. Boyer; Syndicated Law, PC

(57) ABSTRACT

Disclosed are a method and a system for multi-objective optimization of urban train operation. Firstly, speed limit information, slope information and curve radius information of a real train route are obtained, a section is segmented into non-equal sub-sections according to the above information about actual line characteristics, and then a longitudinal dynamics model of the train is constructed in combination with basic vehicle data of the train. Next, energy consumption of the train operation, section operation time, actual parking positions, and rates of acceleration change are calculated, so as to construct a multi-objective optimization model of train operation. Afterwards, a multi-objective differential evolution algorithm is used to solve the multi-objective optimization model, in order to obtain a Pareto optimal solution set of each operation district. Finally, an optimal solution is obtained which takes all objectives into comprehensive consideration, and an optimal train speed curve is generated.

8 Claims, 3 Drawing Sheets

METHOD AND SYSTEM FOR MULTI-OBJECTIVE OPTIMIZATION OF URBAN TRAIN OPERATION

CROSS REFERENCE TO RELATED APPLICATION(S)

This patent application claims the benefit and priority of Chinese Patent Application No. 202110916064.6 filed on Aug. 11, 2021, the disclosure of which is incorporated by reference herein in its entirety as part of the present application.

TECHNICAL FIELD

The present disclosure relates to the technical field of optimization for the rail transport operation, and in particular to a method and a system for multi-objective optimization of urban train operation.

BACKGROUND ART

Urban rail transport plays an indispensable role in China's urban public transport system due to its advantages such as safety, comfort, punctuality, speediness, environmental protection and great carrying capacity. With the increasing mileage of rail transport operation, increasing passenger traffic, and increasing energy consumption of operation, energy saving and consumption reduction have become one of the issues in front of the sustainable development of urban rail transport that must be overcome. In the rail transport system, the traction energy consumption of trains accounts for the largest proportion of the total energy consumption in operation, so the way of reducing the traction energy consumption of trains is of great practical significance to the maximization of energy-saving benefits for the urban rail transport system. In nature, the optimization issue of urban train operation is a multi-objective optimization issue integrating safety, punctuality, precise parking, energy saving and comfort, which aims at finding an "optimal" strategy among many control strategies to ensure minimization of the operation energy consumption and maximization of passengers' comfort as possible in addition to safety, punctuality, and precise parking of the train operation, thus bringing a win-win effect to both railway operation departments and passengers. To sum up, it is of great practical significance and engineering application value to study the optimization method of the urban train operation.

At present, many mature research achievements have been made in the field of train operation optimization. In early times, scholars focused on theoretical researches and deduction, often simplified the model construction, and mostly took numerical algorithms and analytical algorithms as the basis for solution. Therefore, the solution was often locally optimal but not able to guarantee the convergence. With the development of computers, intelligent optimization algorithms are widely used for solution optimization. Many scholars considered the train operation optimization as a single objective optimization, so as to set the operation energy consumption as an objective to be optimized, but they failed to consider the train operation process as a whole and failed to recognize that the process refers to a multi-objective optimization issue in essence. In some of the researches, the process is regarded as involving a multi-objective optimization issue; but some others consider the optimization in the context of ideal route conditions while ignoring the influence of actual route parameters, which makes little significance to practical engineering applications. Still other researches integrate multiple indicators of punctuality, safety, comfort and energy saving into a single objective issue for optimization and solution, which, however, still fail to fully reflect the essential characteristics of the multi-objective optimization. In addition, the genetic algorithm and the particle swarm algorithm are mostly adopted for solution, thus causing problems such as slow convergence and susceptibility to local optimum, which makes the solution unable to achieve the best optimization effect.

SUMMARY

An object of the present disclosure is to provide a method and a system for multi-objective optimization of urban train operation. The present disclosure aims at finding an "optimal" strategy among many control strategies to ensure minimization of the operation energy consumption and maximization of passengers' comfort as possible in addition to safety, punctuality, and precise parking of the train operation, thus bringing a win-win effect to both railway operation departments and passengers.

In order to achieve the above object, the present disclosure provides the following scheme:

A method for multi-objective optimization of urban train operation is provided, including:

acquiring section parameter information about actual route conditions of an urban train;

segmenting each operation section of the urban train into non-equal districts according to the section parameter information to obtain various operation districts of the urban train;

obtaining a longitudinal dynamics model of the urban train according to basic parameter information about the urban train vehicle and the section parameter information;

obtaining values of multi-performance evaluation indicators of the train operation for the urban train in each operation section according to the longitudinal dynamics model of the urban train;

constructing a multi-objective optimization model of the urban train according to the values of the multi-performance evaluation indicators of the train operation;

solving the multi-objective optimization model by using a multi-objective differential evolution algorithm to obtain a Pareto optimal solution set of the urban train in each operation district; and selecting a solution from the Pareto optimal solution set of each operation district, which meets a performance evaluation criteria of the urban train operation indicators, in order to obtain an optimal train speed curve of the urban train in each operation district.

Optionally, obtaining the longitudinal dynamics model of the urban train includes the following specific steps:

obtaining a train force value of the urban train in each operation section according to the basic parameter information about the urban train vehicle and the section parameter information;

constructing the longitudinal dynamics model of the urban train according to the train force value of the urban train in each operation section;

the longitudinal dynamics model of the urban train is expressed as follows:

$$\begin{cases} \dfrac{dt}{ds} = \dfrac{1}{v} \\ v\dfrac{dv}{ds} = F(\mu_f, v) - B(\mu_b, v) - W(s, v) \\ W(s, v) = W_0(v) + W_i(p) + W_c(r) \end{cases}$$

where, t is operation time of the urban train between stations, s is a position when the urban train changes its operating mode, v is an operation speed of the urban train, $\mu_f$ is a proportional coefficient of a traction force versus a braking force actually applied by the urban train, $\mu_b$ is a proportional coefficient of a maximum traction force versus a braking force applied by the urban train, $F(\mu_f,v)$ is a traction force currently applied by the urban train, $B(\mu_b,v)$ is a braking force currently applied by the urban train, $W(s,v)$ is a total operation resistance of the urban train, $W_0(v)$ is a basic resistance of the urban train, $W_i(p)$ is an additional resistance due to curvature of the urban train, and $W_c(r)$ is an additional resistance due to slope of the urban train.

Optionally, the multi-objective optimization model is expressed as follows:

$$\min\{f_E, f_t, f_s, f_c\}$$

$$\text{s.t} \begin{cases} f_E = \int_0^T F \cdot v(t)dt \\ f_t = 1 + \alpha\left(\dfrac{T_Z - T}{T}\right)^2 \\ f_s = 1 + \beta\left(\dfrac{S_Z - S}{S}\right)^2 \\ f_c = \dfrac{1}{1 + |J|^8} \end{cases}$$

where, $f_E$ is an operation energy consumption value of the urban train, $f_t$ is a punctuality indicator of the urban train, $f_s$ is a precise parking indicator of the urban train, $f_c$ is a comfort indicator of the urban train, T is a planned operation time between stations of the urban train, F is a traction force currently applied by the urban train, v is the operation speed of the urban train, $\alpha$ is a punctuality penalty factor, $T_Z$ is an actual operation time between stations of the urban train, $\beta$ is a precise parking penalty factor, $S_Z$ is an actual parking position of the urban train, S is a planned parking position of the urban train, and J is a rate of acceleration change.

Optionally, the solving the multi-objective optimization model by using a multi-objective differential evolution algorithm specifically includes:

generating an initialization population with N individuals by using a population initialization strategy, wherein the individuals in the initialization population represent positions where the urban train changes its operating mode;

calculating an objective function value of each operation indicator of the urban train, which corresponds to each individual in the initialization population;

performing non-dominated sorting of individuals in the initialization population according to the objective function value of each operation indicator of the urban train corresponding to each individual, in order to assign different individuals to different non-dominated layers and select individuals in a first non-dominated layer;

mutating the individuals in the first non-dominated layer by using a self-adaptive mutation strategy, and then performing the crossover and selection operations in the differential evolution algorithm to obtain a new individual set of the first non-dominated layer;

processing the new individual set of the first non-dominated layer by using an evolution strategy based on excellent individuals to generate a new evolutionary population;

setting an iterative termination condition of the evolutionary population, and determining whether the evolutionary population meets the iterative termination condition; if not, the process returns to the step of "an evolution strategy based on excellent individuals is used to process new individual set of the first non-dominated layer so as to generate a new evolutionary population"; and if so, the Pareto optimal solution set of the urban train in each operation district is obtained depending on the evolutionary population.

Optionally, the population initialization strategy includes:

initializing a minimum boundary to generate a first initialization population $P_0$, where the initialization process is as follows:

$$X_{i,n,0} = X_{min} + r(X_{max} - X_{min})$$

initializing a maximum boundary to generate a second initialization population $P_0'$, where the initialization process is as follows:

$$X_{i,n,0}' = X_{min} + X_{max} - X_{i,n,0}$$

merging the first initialization population $P_0$ and the second initialization population $P_0'$, performing the non-dominated sorting on the merged population, and selecting the best N individuals as the initialization population;

where, $X_{i,n,0}$ represents the $i^{th}$ individual in the first initialization population $P_0$, and $X_{i,n,0}'$ represents the individual in the second initialization population $P_0'$, r is a random number in [0,1], n is a dimension of an individual vector, $X_{min}$ and $X_{max}$ respectively represent minimum and maximum of the individual.

Optionally, the self-adaptive mutation strategy includes:

calculating variation factor parameters in the adaptive variation strategy, where the formula is as follows:

$$F(G) = (F_{max} - F_{min}) \cdot (G/G_{max})$$

where, G is a number of iterations, $G_{max}$ is a maximum number of iterations, $F_{max}$ and $F_{min}$ are maximum and minimum variation factors respectively;

setting a random variable value $\lambda$, wherein the random variable value $\lambda$ follows Gaussian distribution;

obtaining mutated individuals according to mutation factor parameters and the random variable value $\lambda$, where a calculation formula of the mutated individuals is as follows:

$$\begin{cases} V_{i,G} = X_{r1,G} + F(X_{r2,G} - X_{r3,G}) & 0 < \lambda < 0.5 \\ V_{i,G} = X_{i,G} + F(X_{best,G} - X_{ri,G}) + F(X_{r1,G} - X_{r2,G}) & 0.5 < \lambda < 1 \end{cases}$$

where, i is a serial number of an individual in the population, r1, r2 and r3 are random positive integers which are not equal to each other, $X_{r1,G}$, $X_{r2,G}$, $X_{r3,G}$ are three individuals randomly selected from the current population, F is a mutation factor, $X_{best,G}$ is a best fitting individual in a G-generation population, $X_{i,G}$ is an $i^{th}$ individual in the G-generation population, and $V_{i,G}$ is the mutated individual generated from the mutation operation.

Optionally, the evolution strategy based on excellent individuals includes:

performing the non-dominated sorting on each individual in the initialization population $P_t$, and sorting the individuals in the initialization population into different non-dominated layers by advantages and disadvantages of the individuals;

performing mutation, crossover and selection operations in the differential evolution algorithm on the individuals at the first non-dominated frontier to generate a new individual set $F_1'$;

merging the initialized population with the new individual set $P_t \cup F_1'$, performing non-dominated sorting on each individual in the merged population to obtain a non-dominated layer, calculating a crowding distance of individuals in different non-dominated layers sequentially, and selecting the best N individuals according to the non-dominated layer sequence and the crowding distance of the individuals, wherein the selected N best individuals form a new population $P_{t+1}$ to be evolved next.

Optionally, a formula for calculating the crowding distance is as follows:

$$D(i_d) = D(i_d) + \frac{D(i+1)_m - D(i-1)_m}{f_m^{max} - f_m^{min}}$$

where, $D(i_d)$ is the crowding distance of individuals, $D(i+1)_m$ represents an $m^{th}$ objective function value of the $(i+1)^{th}$ individual, $D(i-1)_m$ represents an $m^{th}$ objective function value of the $(i-1)^{th}$ individual, and $f_m^{max}$, $f_m^{min}$ represent the maximum and the minimum of the $m^{th}$ objective function value of individuals respectively.

Optionally, performing non-dominated sorting on each individual in the merged population to obtain a non-dominated layer, calculating the crowding distance of individuals in different non-dominated layers sequentially, and selecting the best N individuals according to the non-dominated layer sequence of the individuals and the crowding distance of the individuals, which specifically includes:

initializing the crowding distance of each of the individuals in the same non-dominated layer;

sorting the crowding distance of individuals in the same non-dominated layer in ascending order based on the $m^{th}$ objective function value;

setting the crowding distance of individuals at both ends of each non-dominated layer to infinite, and setting an ideal range of crowding distance values;

screening individuals according to the ideal range of crowding distance values; and selecting the best N individuals according to the non-dominated layer sequence and crowding distance of individuals.

A system for multi-objective optimization of urban train operation is provided, including:

means for acquiring section parameter information, configured to acquire section parameter information about actual route conditions of an urban train;

means for non-equal district segmentation, configured to segment each operation section of the urban train into non-equal districts according to the section parameter information, in order to obtain various operation districts of the urban train;

means for constructing longitudinal dynamics model of the urban train, configured to obtain a longitudinal dynamics model of the urban train according to basic parameter information about the urban train and the section parameter information;

means for calculating longitudinal dynamics model of the urban train, configured to obtain values of multi-performance evaluation indicators of the train operation for the urban train in each operation section according to the longitudinal dynamics model of the urban train;

means for constructing a multi-objective optimization model, configured to construct a multi-objective optimization model of the urban train according to the values of the multi-performance evaluation indicators of the train operation;

means for acquiring optimal solution set, configured to solve the multi-objective optimization model by using a multi-objective differential evolution algorithm in order to obtain a Pareto optimal solution set of the urban train in each operation district;

means for acquiring an optimal train speed curve, configured to select a solution from the Pareto optimal solution set of each operation district, which meets the performance evaluation criteria of the urban train operation indicators, in order to obtain an optimal train speed curve of the urban train in each operation district.

According to embodiments provided in the present disclosure, the present disclosure has the following technical effects: the method for multi-objective optimization of urban train operation provided by the present disclosure addresses the problems of slow convergence and susceptibility to local optimum caused by traditional differential evolution algorithms through an initialization strategy, a self-adaptive selection and mutation mechanism strategy, and an elite individual evolution strategy.

BRIEF DESCRIPTION OF THE DRAWINGS

In order to illustrate the embodiments of the present disclosure or technical schemes in the prior art more clearly, the accompanying drawings required in the embodiments will be briefly introduced below. Apparently, the drawings in the following description are only some embodiments of the present disclosure, and those of ordinary skills in the art may obtain other drawings according to these drawings without creative work.

DETAILED DESCRIPTION OF THE EMBODIMENTS

Technical schemes in the embodiments of the present disclosure will be described clearly and completely with reference to the accompanying drawings thereof. Apparently, the embodiments described herein are only part of, not all of, embodiments in the present disclosure. Based on the embodiments of the present disclosure, all other embodiments obtained by those of ordinary skills in the art without creative work belong to the scope claimed by the present disclosure.

An object of the present disclosure is to provide a method and a system for multi-objective optimization of urban train operation. The present disclosure aims at finding an "optimal" strategy among many control strategies to ensure minimization of the operation energy consumption and maximization of passengers' comfort as possible in addition to safety, punctuality, and precise parking of the train operation, thus bringing a win-win effect to both railway operation departments and passengers.

In order to make the above mentioned objects, features and advantages of the present disclosure more apparently understood, the present disclosure will be further described with reference to figures and embodiments below.

Embodiment 1

Figure 1:
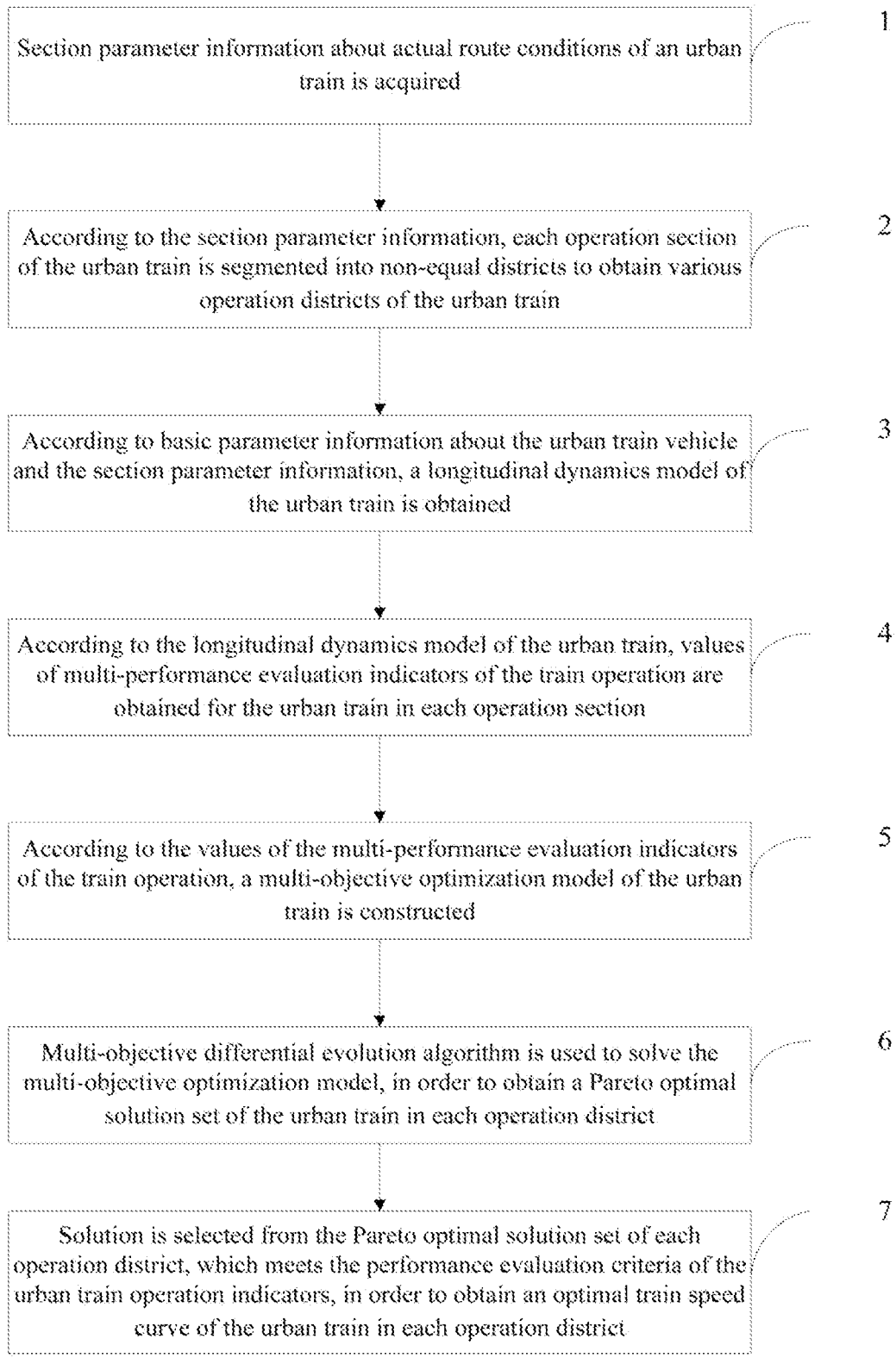
FIG. 1 is a schematic flow diagram of a method for multi-objective optimization of urban train operation according to an embodiment of the present disclosure.

As shown in FIG. 1, the embodiment provides a method for multi-objective optimization of urban train operation, including the steps as follows.

S1: acquiring section parameter information about actual route conditions of an urban train.

Specifically, the section parameter information includes speed limit information, slope information and route curve radius information of each operation section of each urban train.

S2: Segmenting each operation section of the urban train into non-equal districts according to the section parameter information to obtain various operation districts of the urban train.

Specifically, based on the principle that remains the uniqueness of route characteristics of each operation section of the urban train, namely, each operation district of the urban train only corresponds to one speed limit value, one slope value and one route curve radius value, each operation section of the urban train is segmented into non-equal districts, and the speed limit information, slope information and route curve radius information upon the non-equal district segmentation are stored.

S3: Obtaining a longitudinal dynamics model of the urban train according to basic parameter information about the urban train vehicle and the section parameter information;

Specifically, obtaining the longitudinal dynamics model of the urban train includes the following specific steps:

Obtaining a train force value of the urban train in each operation section according to the basic parameter information about the urban train vehicle and the section parameter information, wherein the force value includes a traction force, basic resistance, additional resistance and a braking force of the urban train in each operation section;

Constructing the longitudinal dynamics model of the urban train according to the train force value of the urban train in each operation section;

The longitudinal dynamics model of the urban train is expressed as follows:

$$\begin{cases} \dfrac{dt}{ds} = \dfrac{1}{v} \\ v\dfrac{dv}{ds} = F(\mu_f, v) - B(\mu_b, v) - W(s, v) \\ W(s, v) = W_0(v) + W_i(p) + W_c(r) \end{cases}$$

In the model, t is the operation time of the urban train between stations, s is the position when the urban train changes its operating modes, v is the operation speed of the urban train, $\mu_f$ is the proportional coefficient of a traction force versus a braking force actually applied by the urban train, $\mu_b$ is the proportional coefficient of a maximum traction force versus a braking force applied by the urban train, $F(\mu_f,v)$ is the traction force currently applied by the urban train, $B(\mu_b,v)$ is the braking force currently applied by the urban train, $W(s,v)$ is the total operation resistance of the urban train, $W_0(v)$ is the basic resistance of the urban train, $W_i(p)$ is the additional resistance due to curvature of the urban train, and $W_c(r)$ is the additional resistance due to slope of the urban train.

S4: Obtaining values of multi-performance evaluation indicators of the train operation for the urban train in each operation section according to the longitudinal dynamics model of the urban train.

Specifically, the multi-performance evaluation indicators of the train operation include the operation energy consumption value, operation time value, parking position value and comfort value of the urban train in each operation district.

S5: constructing a multi-objective optimization model of the urban train according to the values of the multi-performance evaluation indicators of the train operation.

Specifically, the multi-objective optimization model is expressed as follows:

$$\min\{f_E, f_t, f_s, f_c\}$$

$$s.t. \begin{cases} f_E = \int_0^T F \cdot v(t) dt \\ f_t = 1 + \alpha\left(\dfrac{T_Z - T}{T}\right)^2 \\ f_s = 1 + \beta\left(\dfrac{S_Z - S}{S}\right)^2 \\ f_c = \dfrac{1}{1 + |J|^8} \end{cases}$$

In the model, $f_E$ is the operation energy consumption value of the urban train, $f_t$ is the punctuality indicator of the urban train, $f_s$ is the precise parking indicator of the urban train, $f_c$ is the comfort indicator of the urban train, T is the planned operation time between stations of the urban train, F is the traction force currently applied by the urban train, v is the operation speed of the urban train, α is the punctuality penalty factor, $T_Z$ is the actual operation time between stations of the urban train, β is the precise parking penalty factor, $S_Z$ is the actual parking position of the urban train, S is the planned parking position of the urban train, and J is the rate of acceleration change.

S6: Solving the multi-objective optimization model by using a multi-objective differential evolution algorithm in order to obtain a Pareto optimal solution set of the urban train in each operation district.

Figure 3:
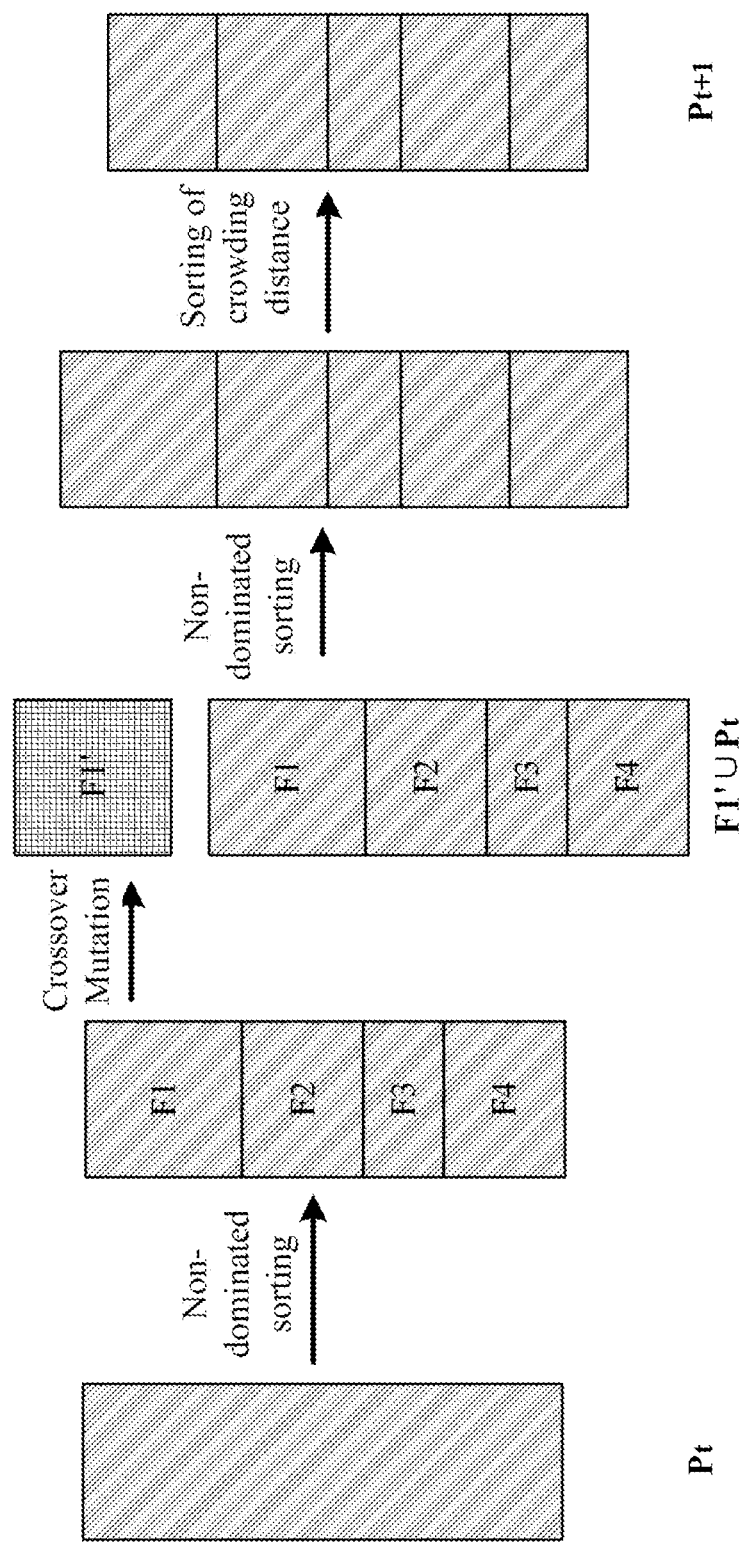
FIG. 3 is a brief process diagram of subject implementation of the multi-objective differential evolution algorithm according to an embodiment of the present disclosure.

As shown in FIG. 3, the solution of the multi-objective optimization model by the multi-objective differential evolution algorithm specifically includes the following steps.

In Step 61, an initialization population with n individuals is generated by using a population initialization strategy, wherein the individuals in the initialization population represent positions where the urban train changes its operating modes. Each individual in the initialization population corresponds to its operation district, and is discretized according to different operating modes, so as to obtain a matrix X={$x_1, x_2, x_3, \ldots, x_N$} of position sites where the corresponding train operating mode changes, wherein each $x_i$(i=1, 2, 3 . . . N) corresponds to a matrix of position sites where the operating mode changes.

Figure 2:
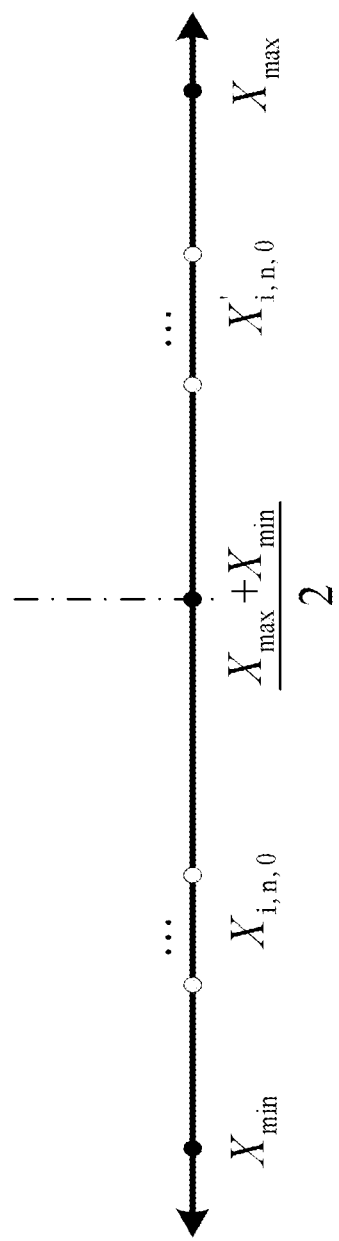
FIG. 2 is a schematic diagram of a population initialization strategy according to an embodiment of the present disclosure.

As shown in FIG. 2, the population initialization strategy includes:

Initializing the minimum boundary to generate a first initialization population $P_0$, where the initialization process is as follows:

$$X_{i,n,0} = X_{min} + r(X_{max} - X_{min})$$

Initializing the maximum boundary to generate a second initialization population $P_0'$, where the initialization process is as follows:

$$X_{i,n,0}'=X_{min}+X_{max}-X_{i,n,0}$$

Merging the first initialization population $P_0$ and the second initialization population $P_0'$, performing the non-dominated sorting on the merged population, and selecting the best N individuals as the initialization population;

In the formula, $X_{i,n,0}$ represents the $i^{th}$ individual in the first initialization population $P_0$, and $X_{i,n,0}'$ represents the individual in the second initialization population $P_0'$, r is the random number in [0,1], n is the dimension of an individual vector, $X_{min}$ and $X_{max}$ respectively represent the minimum and maximum of the individual.

In Step 62, an objective function value of each operation indicator of the urban train is calculated, which corresponds to each individual in the initialization population;

In Step 63, according to the objective function value of each operation indicator of the urban train corresponding to each individual, non-dominated sorting of individuals in the initialization population is carried out, in order to assign different individuals to different non-dominated layers and select individuals in a first non-dominated layer.

Specifically, the step of assigning different individuals to different non-dominated layers includes:

Acquiring any two non-dominated solution sets of each individual in the initialization population;

Setting the $i^{th}$ non-dominated solution set among the non-dominated solution sets as the first non-dominated layer, and setting a non-dominated order value $i_{ranki}$ of all individuals in the non-dominated layer; and Eliminating the stratified individuals in the population from the initialization population.

In Step 64, a self-adaptive mutation strategy is used to mutate the individuals in the first non-dominated layer, and then the crossover and selection operations in the differential evolution algorithm are carried out to obtain a new individual set of the first non-dominated layer.

Specifically, the self-adaptive mutation strategy includes:

Calculating variation factor parameters in the adaptive variation strategy, where the formula is as follows:

$$F(G)=(F_{max}-F_{min})\cdot(G/G_{max}),$$

Where G is the number of iterations, $G_{max}$ is the maximum number of iterations, $F_{max}$ and $F_{min}$ are the maximum and minimum variation factors;

Setting a random variable value $\lambda$, wherein the random variable value $\lambda$ follows the Gaussian distribution $\lambda$; and Obtaining mutated individuals according to the mutation factor parameters and the random variable value $\lambda$, where the calculation formula of the mutated individuals is as follows:

$$\begin{cases} V_{i,G} = X_{r1,G} + F(X_{r2,G} - X_{r3,G}) & 0 < \lambda < 0.5 \\ V_{i,G} = X_{i,G} + F(X_{best,G} - X_{ri,G}) + F(X_{r1,G} - X_{r2,G}) & 0.5 < \lambda < 1 \end{cases}$$

In the formula, i is the serial number of an individual in the population, r1, r2 and r3 are random positive integers which are not equal to each other, $X_{r1,G}$, $X_{r2,G}$, $X_{r3,G}$ are three individuals randomly selected from the current population, F is the mutation factor, $X_{best,G}$ is the best fitting individual in the G-generation population, $X_{i,G}$ is the $i^{th}$ individual in the G-generation population, and $V_{i,G}$ is the mutated individual generated from the mutation operation.

One of the decisive factors for the convergence of the differential evolution algorithm is the crossover probability. In traditional algorithms, a quite large value is often selected for the crossover probability usually from an interval of (0.5, 1.0). In order to improve the convergence characteristics of the self-adaptive mutation strategy in this embodiment, the following formula is selected to calculate numerical values of its crossover probabilities:

$$CR(G)=CR_{max}+(CR_{max}-CR_{min})\cdot(G/G_{max})$$

In the formula, G is the number of iterations, $G_{max}$ is the maximum number of iterations, $CR_{max}$ and $CR_{min}$ are the maximum and minimum crossover probabilities, respectively.

In Step 65, an evolution strategy based on excellent individuals is used to process new individual set of the first non-dominated layer so as to generate a new evolutionary population.

Specifically, the evolutionary strategy based on optimal individuals includes the steps as below.

In Step 651, non-dominated sorting is performed on each individual in the initialization population $P_t$, and the individuals in the initialization population are sorted into different non-dominated layers by advantages and disadvantages of the individuals.

In Step 652, mutation, crossover and selection operations in the differential evolution algorithm are performed on the individuals at the first non-dominated frontier, so as to generate a new individual set $F_1'$;

In Step 653, the initialized population are the new individual set $P_t \cup F_1'$ are merged, non-dominated sorting is performed on each individual in the merged population to obtain a non-dominated layer, the crowding distance of individuals in different non-dominated layers is calculated sequentially, and the best N individuals are selected according to the non-dominated layer sequence of the individuals and the crowding distance of the individuals, wherein the selected N best individuals form a new population $P_{t+1}$ to be evolved next.

In the step, the formula for calculating the crowding distance is as follows:

$$D(i_d) = D(i_d) + \frac{D(i+1)_m - D(i-1)_m}{f_m^{max} - f_m^{min}}$$

In the formula, $D(i_d)$ is the crowding distance of individuals, $D(i+1)_m$ represents the $m^{th}$ objective function value of the $i+1^{th}$ individual, $D(i-1)_m$ represents the $m^{th}$ objective function value of the $i-1^{th}$ individual, and $f_m^{max}$, $f_m^{min}$ represent the maximum and the minimum of the $m^{th}$ objective function value of this individual.

Specifically, non-dominated sorting is performed on each individual in the merged population to obtain a non-dominated layer, the crowding distance of individuals in different non-dominated layers is calculated sequentially, and the best N individuals are selected according to the non-dominated layer sequence of the individuals and the crowding distance of the individuals, which specifically includes:

Initializing the crowding distance of all individuals in the same non-dominated layer, so that the crowding distance $D(i_d)$ of all individuals is set to 0;

Sorting the crowding distance of individuals in the same non-dominated layer in ascending order based on the $m^{th}$ objective function value;

Setting the crowding distance of individuals at both ends of each non-dominated layer to infinite, and setting an ideal range for crowding distance values;

Screening individuals according to the ideal range of crowding distance values; and Selecting the best N individuals according to the non-dominated layer sequence and crowding distance of individuals.

In Step 66, an iterative termination condition of the evolutionary population is set up, and it is determined whether the evolutionary population meets the iterative termination condition; if not, the process returns to the step of "an evolution strategy based on excellent individuals is used to process new individual set of the first non-dominated layer so as to generate a new evolutionary population"; and if so, the Pareto optimal solution set of the urban train in each operation district is obtained depending on the evolutionary population.

S7: Selecting a solution from the Pareto optimal solution set of each operation district, which meets the performance evaluation criteria of the urban train operation indicators, in order to obtain an optimal train speed curve of the urban train in each operation district.

Specifically, the performance evaluation criteria of the urban train operation indicators specifically include:

Punctuality: the time error is ranged about ±5% of the planned inter-station operation time;

Parking precision: parking error is ranged ±30 cm;

Comfort level: refer to the comfort evaluation criteria given by International Standard ISO2631, and see the following table for details:

TABLE 1

International Standard
ISO2631 Comfort Evaluation Indicator

| Comfort level | Rate of acceleration change. | Sense level |
| --- | --- | --- |
| 1 | <0.315 | Very comfortable |
| 2 | 0.315~0.63 | Comfortable |
| 3 | 0.63~1.0 | Relative comfortable |
| 4 | 1.0~1.6 | Uncomfortable |
| 5 | 1.6~2.5 | Very uncomfortable |
| 6 | >2.5 | Extremely uncomfortable |

In specific application processes, the driver can drive by selecting train speed curves corresponding to different solutions depending on actual requirements, such as whether the train is ahead of or behind schedule, so as to make up for the error arising in the train operation time and to ensure that the train can arrive on time.

In comparison to other techniques in the prior art, the method for multi-objective optimization of urban train operation based on the multi-objective differential evolution provided in the present disclosure is used to construct a four-objective optimization model which takes the train operation energy consumption indicator, punctuality indicator, parking precision indicator, and comfort indicator as optimization targets. The method focuses on the problems of slow convergence and susceptibility to local optimum caused by traditional differential evolution algorithms, provides an improved multi-objective differential evolution algorithm on the basis of the improved initialization strategy, the self-adaptive selection mutation mechanism strategy, and the elite individual evolution strategy, thus allowing a quick search of the Pareto optimal solution for solving the multi-objective optimization model of urban train operation.

Finally, according to the actual need of the driver, the corresponding Pareto solution can be selected to generate the corresponding train speed curve, which is of a great practical significance for guiding the inter-station operation optimization of the urban train.

Embodiment 2

The embodiment provides a system for multi-objective optimization of urban train operation, including:

means for acquiring section parameter information, configured to acquire section parameter information about actual route conditions of an urban train;

means for non-equal district segmentation, configured to segment each operation section of the urban train into non-equal districts according to the section parameter information, in order to obtain various operation districts of the urban train;

means for constructing longitudinal dynamics model of the urban train, configured to obtain a longitudinal dynamics model of the urban train according to basic parameter information about the urban train and the section parameter information;

means for calculating longitudinal dynamics model of the urban train, configured to obtain values of multi-performance evaluation indicators of the train operation for the urban train in each operation section according to the longitudinal dynamics model of the urban train;

means for constructing a multi-objective optimization model, configured to construct a multi-objective optimization model of the urban train according to the values of the multi-performance evaluation indicators of the train operation;

means for acquiring optimal solution set, configured to solve the multi-objective optimization model by using a multi-objective differential evolution algorithm in order to obtain a Pareto optimal solution set of the urban train in each operation district;

means for acquiring an optimal train speed curve, configured to select a solution from the Pareto optimal solution set of each operation district, which meets the performance evaluation criteria of the urban train operation indicators, in order to obtain an optimal train speed curve of the urban train in each operation district.

In this specification, various embodiments are described in a progressive manner, with each embodiment focusing on its differences from other embodiments, while cross reference would be enough for those same or similar parts between the embodiments. As the system disclosed in the embodiment corresponds to the method disclosed in the embodiment, the description is relatively simple, and the correlated parts can be found in the method description.

Principles and implementation of this present disclosure are described by specific examples, and the explanation of the above embodiments is only used to help understand the method and its core idea of the present disclosure. In addition, those of ordinary skills in the art may take some modifications in the specific implementation and application scope according to the idea of the present disclosure. To sum up, the content of this specification should not be construed as limiting the present disclosure.

What is claimed is:
1. A method for multi-objective optimization of urban train operation, comprising:
acquiring section parameter information about actual route conditions of an urban train;

segmenting each operation section of the urban train into non-equal districts according to the section parameter information to obtain various operation districts of the urban train;

obtaining a longitudinal dynamics model of the urban train according to basic parameter information about the urban train vehicle and the section parameter information;

obtaining values of multi-performance evaluation indicators of the train operation for the urban train in each operation section according to the longitudinal dynamics model of the urban train; wherein, the multi-performance evaluation indicators of the train operation comprise an operation energy consumption value, an operation time value, a parking position value and a comfort value of the urban train in each operation district;

constructing a multi-objective optimization model of the urban train according to the values of the multi-performance evaluation indicators of the train operation using a processor; wherein, the multi-objective optimization model is expressed as follows:

$$\min\{f_E, f_t, f_s, f_c\}$$

$$s.t \begin{cases} f_E = \int_0^T F \cdot v(t)dt \\ f_t = 1 + \alpha\left(\frac{T_Z - T}{T}\right)^2 \\ f_s = 1 + \beta\left(\frac{S_Z - S}{S}\right)^2 \\ f_c = \frac{1}{1 + |J|^8} \end{cases}$$

where, $f_E$ is an operation energy consumption value of the urban train, $f_t$ is a punctuality indicator of the urban train, $f_s$ is a precise parking indicator of the urban train, $f_c$ is a comfort indicator of the urban train, T is a planned operation time between stations of the urban train, F is a traction force currently applied by the urban train, v is an operation speed of the urban train, $\alpha$ is a punctuality penalty factor, $T_Z$ is an actual operation time between stations of the urban train, $\beta$ is a precise parking penalty factor, $S_Z$ is an actual parking position of the urban train, S is a planned parking position of the urban train, and J is a acceleration change rate;

solving the multi-objective optimization model using a multi objective differential evolution algorithm to obtain a Pareto optimization solution set of the urban train in each operation district using the processor; wherein the solving the multi-objective optimization model by using a multi-objective differential evolution algorithm comprises:

generating an initialization population having N individuals by using a population initialization strategy, wherein the individuals in the initialization population represent positions where the urban train changes its operating modes;

calculating an objective function value of each operation indicator of the urban train, which corresponds to each individual in the initialization population;

performing non-dominated sorting of individuals in the initialization population according to the objective function value of each operation indicator of the urban train corresponding to each individual, in order to assign different individuals to different non-dominated layers and select individuals in a first non-dominated layer;

mutating the individuals in the first non-dominated layer by using a self-adaptive mutation strategy, and then performing the crossover and selection operations in the differential evolution algorithm to obtain a new individual set of the first non-dominated layer;

processing the new individual set of the first non-dominated layer by using an evolution strategy based on excellent individuals to generate a new evolutionary population; and, setting an iterative termination condition of the evolutionary population, and determining whether the evolutionary population meets the iterative termination condition; returning to the step of processing the new individual set of the first non-dominated layer by using an evolution strategy based on excellent individuals to generate a new evolutionary population, if the evolutionary population does not meet the iterative termination condition; and obtaining the Pareto optimal solution set of the urban train in each operation district according to the evolutionary population, if the evolutionary population meets the iterative termination condition;

selecting a solution from the Pareto optimal solution set for controlling the urban in each operation district, which meets a performance evaluation criteria of the urban train operation indicators, in order to obtain an optimal train speed curve of the urban train in each operation district.

2. The method for multi-objective optimization of urban train operation according to claim 1, wherein the obtaining the longitudinal dynamics model of the urban train comprises following specific steps:

obtaining a train force value of the urban train in each operation section according to the basic parameter information about the urban train vehicle and the section parameter information;

constructing the longitudinal dynamics model of the urban train according to the train force value of the urban train in each operation section;

wherein, the longitudinal dynamics model of the urban train is expressed as follows:

$$\begin{cases} \frac{dt}{ds} = \frac{1}{v} \\ v\frac{dv}{ds} = F(\mu_f, v) - B(\mu_b, v) - W(s, v) \\ W(s, v) = W_0(v) + W_i(p) + W_c(r) \end{cases}$$

where, t is operation time of the urban train between stations, s is a position when the urban train changes its operating modes, v is an operation speed of the urban train, $\mu_f$ is a proportional coefficient of a traction force versus a braking force actually applied by the urban train, $\mu_b$ is a proportional coefficient of a maximum traction force versus a braking force applied by the urban train, $F(\mu_f,v)$ is a traction force currently applied by the urban train, $B(\mu_b,v)$ is a braking force currently applied by the urban train, $W(s,v)$ is a total operation resistance of the urban train, $W_0(v)$ is a basic resistance of the urban train, $W_i(p)$ is an additional resistance due to curvature of the urban train, and $W_c(r)$ is an additional resistance due to slope of the urban train.

3. The method for multi-objective optimization of urban train operation according to claim 1, wherein the population initialization strategy comprises:
  initializing a minimum boundary to generate a first initialization population $P_0$, wherein the initialization process is as follows:

$$X_{i,n,0} = X_{min} + r(X_{max} - X_{min})$$

initializing a maximum boundary to generate a second initialization population $P_0'$, wherein the initialization process is as follows:

$$X_{i,n,0}' = X_{min} + X_{max} - X_{i,n,0}$$

merging the first initialization population $P_0$ and the second initialization population $P_0'$, performing the non-dominated sorting on the merged population, and selecting the best N individuals as the initialization population;
  where, $X_{i,n,0}$ represents the $i^{th}$ individual in the first initialization population $P_0$, and $X_{i,n,0}'$ represents the individual in the second initialization population $P_0'$, r is a random number in [0,1], n is a dimension of an individual vector, $X_{min}$ and $X_{max}$ respectively represent minimum and maximum of the individual.

4. The method for multi-objective optimization of urban train operation according to claim 1, wherein the self-adaptive mutation strategy comprises:
  calculating variation factor parameters in the adaptive variation strategy, wherein the formula is as follows:

$$F(G) = (F_{max} - F_{min}) \cdot (G/G_{max})$$

where, G is a number of iterations, $G_{max}$ is a maximum number of iterations, $F_{max}$ and $F_{min}$ are maximum and minimum variation factors respectively;
  setting a random variable value $\lambda$, wherein the random variable value $\lambda$ follows Gaussian distribution;
  obtaining mutated individuals according to mutation factor parameters and the random variable value $\lambda$, wherein a calculation formula of the mutated individuals is as follows:

$$\begin{cases} V_{i,G} = X_{r1,G} + F(X_{r2,G} - X_{r3,G}) & 0 < \lambda < 0.5 \\ V_{i,G} = X_{i,G} + F(X_{best,G} - X_{ri,G}) + F(X_{r1,G} - X_{r2,G}) & 0.5 < \lambda < 1 \end{cases}$$

where, i is a serial number of an individual in the population, r1, r2 and r3 are random positive integers which are not equal to each other, $X_{r1,G}$, $X_{r2,G}$, $X_{r3,G}$ are three individuals randomly selected from the current population, F is a mutation factor, $X_{best,G}$ is a best fitting individual in a G-generation population, $X_{i,G}$ is an $i^{th}$ individual in the G-generation population, and $V_{i,G}$ is the mutated individual generated from the mutation operation.

5. The method for multi-objective optimization of urban train operation according to claim 1, wherein the evolution strategy based on excellent individuals comprises:
  performing the non-dominated sorting on each individual in the initialization population $P_t$, and sorting the individuals in the initialization population into different non-dominated layers by advantages and disadvantages of the individuals;
  performing mutation, crossover and selection operations in the differential evolution algorithm on the individuals at the first non-dominated frontier to generate a new individual set $F_1'$;
  merging the initialized population with the new individual set $P_t \cup F_1'$, performing non-dominated sorting on each individual in the merged population to obtain a non-dominated layer, calculating a crowding distance of individuals in different non-dominated layers sequentially, and selecting the best N individuals according to the non-dominated layer sequence of the individuals and the crowding distance of the individuals, wherein the selected N best individuals form a new population $P_{t+1}$ to be evolved next.

6. The method for multi-objective optimization of urban train operation according to claim 3, wherein a formula for calculating the crowding distance is as follows:

$$D(i_d) = D(i_d) + \frac{D(i+1)_m - D(i-1)_m}{f_m^{max} - f_m^{min}}$$

where, $D(i_d)$ is the crowding distance of individuals, $D(i+1)_m$ represents an $m^{th}$ objective function value of the $(i+1)^{th}$ individual, $D(i-1)_m$ represents an $m^{th}$ objective function value of the $(i-1)^{th}$ individual, and $f_m^{max}$, $f_m^{min}$ represent the maximum and the minimum of the $m^{th}$ objective function value of individuals respectively.

7. The method for multi-objective optimization of urban train operation according to claim 3, wherein performing non-dominated sorting on each individual in the merged population to obtain a non-dominated layer, calculating the crowding distance of individuals in different non-dominated layers sequentially, and selecting the best N individuals according to the non-dominated layer sequence of the individuals and the crowding distance of the individuals, comprising:
  initializing the crowding distance of each of the individuals in the same non-dominated layer;
  sorting the crowding distance of individuals in the same non-dominated layer in ascending order based on the $m^{th}$ objective function value;
  setting the crowding distance of individuals at both ends of each non-dominated layer to infinite, and setting an ideal range of crowding distance values;
  screening individuals according to the ideal range of crowding distance values; and
  selecting the best N individuals according to the non-dominated layer sequence and crowding distance of individuals.

8. A system for multi-objective optimization of urban train operation, comprising:
  means for acquiring section parameter information, configured to acquire section parameter information about actual route conditions of an urban train;
  means for non-equal district segmentation, configured to segment each operation section of the urban train into non-equal districts according to the section parameter information, in order to obtain various operation districts of the urban train;
  means for constructing longitudinal dynamics model of the urban train, configured to obtain a longitudinal dynamics model of the urban train according to basic parameter information about the urban train and the section parameter information;
  means for calculating longitudinal dynamics model of the urban train, configured to obtain values of multi-performance evaluation indicators of the train operation for the urban train in each operation section according to the longitudinal dynamics model of the urban train;

wherein the multi-performance evaluation indicators of the train operation comprise an operation energy consumption value, an operation time value, a parking position value and a comfort value of the urban train in each operation district;

means for constructing a multi-objective optimization model, configured to construct a multi-objective optimization model of the urban train according to the values of the multi-performance evaluation indicators of the train operation; wherein the multi-objective optimization model is expressed as follows:

$$\min\{f_E, f_t, f_s, f_c\}$$

$$s.t \begin{cases} f_E = \int_0^T F \cdot v(t)dt \\ f_t = 1 + \alpha\left(\frac{T_Z - T}{T}\right)^2 \\ f_s = 1 + \beta\left(\frac{S_Z - S}{S}\right)^2 \\ f_c = \frac{1}{1 + |J|^8} \end{cases}$$

where, $f_E$ is an operation energy consumption value of the urban train, $f_t$ is a punctuality indicator of the urban train, $f_s$ is a precise parking indicator of the urban train, $f_c$ is a comfort indicator of the urban train, T is a planned operation time between stations of the urban train, F is a traction force currently applied by the urban train, v is an operation speed of the urban train, α is a punctuality penalty factor, $T_Z$ is an actual operation time between stations of the urban train, β is a precise parking penalty factor, $S_Z$ is an actual parking position of the urban train, S is a planned parking position of the urban train, and J is a acceleration change rate;

means for acquiring optimal solution set, configured to solve the multi-objective optimization model by using a multi-objective differential evolution algorithm in order to obtain a Pareto optimal solution set of the urban train in each operation district; wherein, the solving the multi-objective optimization model by using a multi-objective differential evolution algorithm comprises:

generating an initialization population having N individuals by using a population initialization strategy, wherein the individuals in the initialization population represent positions where the urban train changes its operating modes;

calculating an objective function value of each operation indicator of the urban train, which corresponds to each individual in the initialization population;

performing non-dominated sorting of individuals in the initialization population according to the objective function value of each operation indicator of the urban train corresponding to each individual, in order to assign different individuals to different non-dominated layers and select individuals in a first non-dominated layer;

mutating the individuals in the first non-dominated layer by using a self-adaptive mutation strategy, and then performing the crossover and selection operations in the differential evolution algorithm to obtain a new individual set of the first non-dominated layer;

processing the new individual set of the first non-dominated layer by using an evolution strategy based on excellent individuals to generate a new evolutionary population; and, setting an iterative termination condition of the evolutionary population, and determining whether the evolutionary population meets the iterative termination condition; returning to the step of processing the new individual set of the first non-dominated layer by using an evolution strategy based on excellent individuals to generate a new evolutionary population, if the evolutionary population does not meet the iterative termination condition; and obtaining the Pareto optimal solution set of the urban train in each operation district according to the evolutionary population, if the evolutionary population meets the iterative termination condition;

and, means for acquiring an optimal train speed curve, configured to select a solution from the Pareto optimal solution set of each operation district, which meets the performance evaluation criteria of the urban train operation indicators, in order to obtain an optimal train speed curve of the urban train in each operation district.

* * * * *